United States Patent [19]

Resnick

[11] 4,295,207

[45] Oct. 13, 1981

[54] DATA PROCESSING APPARATUS FOR RECEIVING AND DECODING WORDS IN WHICH DATA IS ENCODED BY PHASE REVERSALS OR NON-PHASE REVERSALS OF A SIGNAL OF A PREDETERMINED FREQUENCY

[75] Inventor: Martin L. Resnick, Chestnut Hill, Mass.

[73] Assignee: GTE Laboratories Incorporated, Waltham, Mass.

[21] Appl. No.: 94,241

[22] Filed: Nov. 14, 1979

[51] Int. Cl.³ .......................... G06F 3/05; G06F 5/00
[52] U.S. Cl. ................................................ 364/900
[58] Field of Search ... 364/200 MS File, 900 MS File; 179/5 P

[56] References Cited

U.S. PATENT DOCUMENTS

| | | | |
|---|---|---|---|
| 2,934,746 | 4/1960 | Woo | 364/900 |
| 3,395,396 | 7/1968 | Pasternak | 364/200 |
| 3,430,208 | 2/1969 | Axelson | 364/900 |
| 3,482,045 | 12/1969 | Chase | 179/5 P |
| 3,967,104 | 6/1976 | Brantingham | 364/900 |

Primary Examiner—Harvey E. Springborn
Attorney, Agent, or Firm—Peter Xiarhos

[57] ABSTRACT

A data processing apparatus for receiving and processing coded words each word including, in succession, a reference bit, a start bit, data or command bits, a flag bit, a stop bit and a parity bit. The various bits are encoded within a corresponding number of bit periods by eighteen cycles of a 900 hertz signal. The start bit is reversed in phase with respect to the phase of the reference bit to represent a logic "0" and each of the additional bits is either reversed in phase or not reversed in phase with respect to the preceding bit thereby to represent a logic "0" or logic "1", respectively.

The data processing apparatus in accordance with the invention includes a microprocessor which performs multiple sampling and frequency comparison operations on each coded word to detect and lock onto the reference bit and then to detect the phase reversed start bit. The microprocessor then positions its internal timing so as to take samples of the coded word at the midpoints of the successive bit periods and to perform frequency comparison operations to detect phase reversals or lack of phase reversals and thereby determine the logic values of the other bits. The processing performed by the microprocessor tolerates slight frequency shifts and skewing of data.

21 Claims, 1 Drawing Figure

DATA PROCESSING APPARATUS FOR RECEIVING AND DECODING WORDS IN WHICH DATA IS ENCODED BY PHASE REVERSALS OR NON-PHASE REVERSALS OF A SIGNAL OF A PREDETERMINED FREQUENCY

CROSS-REFERENCE TO RELATED APPLICATIONS

The present application discloses subject matter which is disclosed, and claimed, in the following co-pending applications:

Ser. No. 965,808, filed Dec. 4, 1978, now U.S. Pat. No. 4,224,478, in the names of Robert J. Fahey and Martin L. Resnick, entitled "DATA TRANSMISSION CIRCUIT", and assigned to GTE Sylvania Incorporated and GTE Laboratories Incorporated;

Ser. No. 965,809, filed Dec. 4, 1978, now U.S. Pat. No. 4,220,825, in the name of Rober J. Fahey, entitled "TELEPHONE STATUS MONITOR CIRCUIT", and assigned to GTE Sylvania Incorporated;

Ser. No. 965,756, filed Dec. 4, 1978, now U.S. Pat. No. 4,224,602, in the names of Richard W. Anderson and Alfred I. Bottner, entitled "SIGNALLING DEVICE", and assigned to GTE Sylvania Incorporated;

Ser. No. 973,201, filed Dec. 26, 1978, now U.S. Pat. No. 4,220,872, in the name of Robert J. Fahey, entitled "D.C. POWER SUPPLY CIRCUIT", and assigned to GTE Sylvania Incorporated;

Ser. No. 973,218, filed Dec. 26, 1978, now U.S. Pat. No. 4,225,792, in the name of Robert J. Fahey, entitled "DETECTOR CIRCUIT", and assigned to GTE Sylvania Incorporated;

Ser. No. 75,782, filed Sept. 17, 1979, in the name of Richard L. Naugle, entitled "SENSING APPARATUS", and assigned to GTE Laboratories Incorporated;

Ser. No. 75,769, filed Sept. 17, 1979, in the names of Richard L. Naugle and William L. Geller, entitled "EXIT-ENTRY APPARATUS", and assigned to GTE Laboratories Incorporated;

Ser. No. 094,015, filed concurrently herewith, in the names of Jeffrey R. Fox, Arthur Margolies, Rob Moolenbeek and Martin L. Resnick, entitled "APPARATUS FOR MONITORING AND SIGNALLING SYSTEM", and assigned to GTE Laboratories Incorporated;

Ser. No. 094,018, filed concurrently herewith, in the names of Richard W. Anderson, J. Edward Schlener and Martin L. Resnick, entitled "APPARATUS FOR MONITORING AND SIGNALLING SYSTEM", and assigned to GTE Sylvania Incorporated and GTE Laboratories Incorporated;

Ser. No. 094,013, filed concurrently herewith, in the names of Richard W. Anderson and J. Edward Schlener, entitled "APPARATUS FOR MONITORING AND SIGNALLING SYSTEM", and assigned to GTE Sylvania Incorporated;

Ser. No. 094,012, filed concurrently herewith, in the names or Robert J. Fahey and Martin L. Resnick, entitled "TELEPHONE STATUS MONITOR APPARATUS", and assigned to GTE Sylvania Incorporated and GTE Laboratories Incorporated;

Ser. No. 094,014, filed concurrently herewith, in the names of Robert J. Fahey and Martin L. Resnick, entitled "APPARATUS FOR MONITORING USAGE OF A TELEPHONE", and assigned to GTE Sylvania Incorporated and GTE Laboratories Incorporated;

Ser. No. 094,245, filed concurrently herewith, in the names of Robert A. Norbedo and Martin L. Resnick, entitled "APPARATUS FOR SIGNALLING SYSTEM", and assigned to GTE Laboratories Incorporated;

Ser. No. 094,242, filed concurrently herewith, in the names of Robert J. Fahey and Martin L. Resnick, entitled "APPARATUS FOR MONITORING AND SIGNALLING SYSTEM", and assigned to GTE Sylvania Incorporated and GTE Laboratories Incorporated;

Ser. No. 094,016, filed concurrently herewith, in the names of Richard W. Anderson, Robert J. Fahey, William R. McClellan, and J. Edward Schlener, entitled "MONITORING AND SIGNALLING SYSTEM", and assigned to GTE Sylvania Incorporated;

Ser. No. 094,017, filed concurrently herewith, in the names of Hans G. Blank and Martin L. Resnick, entitled "APPARATUS FOR COMMUNICATING WITH PROCESSING APPARATUS OVER A TELEPHONE NETWORK", and assigned to GTE Laboratories Incorporated;

Ser. No. 094,243, filed concurrently herewith, in the names of Robert J. Fahey and Robert A. Norbedo, entitled "APPARATUS FOR SIGNALLING SYSTEM", and assigned to GTE Sylvania Incorporated and GTE Laboratories Incorporated;

Ser. No. 094,019, filed concurrently herewith, in the names of Robert J. Fahey, Robert A. Norbedo and J. Edward Schlener, entitled "APPARATUS FOR MONITORING AND SIGNALLING SYSTEM", and assigned to GTE Sylvania Incorporated and GTE Laboratories Incorporated;

Ser. No. 094,244, filed concurrently herewith, in the names of Robert J. Fahey and Robert A. Norbedo, entitled "APPARATUS FOR SIGNALLING SYSTEM", and assigned to GTE Sylvania Incorporated and GTE Laboratories Incorporated; and Ser. No. 094,246, filed concurrently herewith, in the names of Robert J. Fahey, Robert A. Norbedo and Martin L. Resnick, entitled "VARIABLE TIMING SYSTEM", and assigned to GTE Sylvania Incorporated and GTE Laboratories Incorporated.

The following co-pending applications are directed to apparatus which may be employed in the signalling and monitoring system of the present invention:

Ser. No. 75,783, filed Sept. 17, 1979, in the names of Jeffrey R. Fox, Arthur Margolies, and Rob Moolenbeek, entitled "ELECTRICAL POWER SUPPLY APPARATUS", and assigned to GTE Laboratories Incorporated; and Ser. No. 084,976, filed Oct. 15, 1979, in the name of William L. Geller, entitled "DIGITAL COMMUNICATIONS RECEIVER", and assigned to GTE Laboratories Incorporated.

BACKGROUND OF THE INVENTION

The present invention relates to a monitoring and signalling system. More particularly, the present invention relates to a monitoring and signalling system such as a home health care system for monitoring the activities of individuals within their own homes, apartments, etc., and for providing bi-directional communication between these locations and a centralized communications center.

In recent years, as the general population has become older and the number of elderly persons in the population has increased, and also as a result of increased social welfare legislation directed to the needs of these persons, there has been an increased reliance and utilization of professional care institutions such as hospitals, nursing homes and retirement centers for providing health care and maintenance for these individuals. A large majority of these individuals are maintained and cared for in such institutions for good and proper reasons, most typically for the treatment of medical problems requiring medical factilities and equipment and the professional services of doctors, nurses and the like. However, there are a number of individuals who are presently maintained in institutions without medical reason. These individuals generally have no family or friends to care for them or who do not wish to impose upon or burden such family or friends and are prepared to sacrifice some measure of independence for the security and freedom from worry, anxiety, and loneliness that institutions can provide. It has therefore been recognized that if alternatives to institutionalization can be provided, especially for those individuals who do not require constant or continuing institutional attention or observation, while providing a substantial degree of security and independence for these individuals, preferably within their own homes, the burdens on the institutional care system can be reduced and result in lower health care costs. Any such alternatives which would also produce the same results for individuals other than the elderly, such as young handicapped, disabled or infirm adults, would also have the effect of improving the quality of life of such individuals and, at the same time, reducing health care costs.

A variety of apparatus and systems have been proposed heretofore directed to solutions to the problems as discussed hereinabove. One such system, developed in Sweden, is described in U.S. Pat. No. 3,885,235 and is adapted to monitor passively normal, routine activities of an individual in his or her own residence and to produce alarm conditions in the event these routine activities are not performed during some specified period of time, for example, a period of up to 24 hours. The system as described in the patent includes a plurality of actuating units which may be variously located in predetermined areas of the residence, such as halls, lavatories, bathrooms and bedrooms, and which may be associated with apparatus likely to be actuated or used routinely by the individual during the normal course of the day. This apparatus may include, by way of example, lighting circuits, radio sets, television sets and household appliances. Actuation or use of any one of the actuating units during the aforesaid specific time period will cause an electromechanical timer set to this time period to be reset and to repeat its timing cycle. In the event no actuating unit is actuated or used during the time period, for example, due to inactivity or incapacity of the individual, the timer times out after the time period and an alarm condition, for example, in the form of an audible or visual alarm, is produced by the system indicative of this situation. If the alarm condition was produced as the result of inactivity rather than incapacity, the user may disable the system by the use of a master switch. The master switch may also be used to disable the system when the individual leaves his or her residence for a prolonged period of time, for example, for a period of time greater than the time period of the timer. Upon return of the individual, the system is arranged so that routine operation of any one of the actuating units will have the effect of resetting the timer and causing the timer to repeat its timing cycle. The system as described above may also include an alarm switch in the residence for use by the individual in producing alarm conditions during emergencies, such as medical emergencies or accidents.

In a later version of the system as described in the aforementioned U.S. Pat. No. 3,885,235, known as the "Automatic Warning Aid (AWA)", additional features are provided, including a direction sensitive photocell optics arrangement in the bathroom; an electronic timer having two time periods, specifically, a short time period associated with the bathroom optics arrangement and a longer time period associated with all other actuating units; a pre-alarm cycle effective prior to an actual alarm cycle and during which an alarm condition can be cancelled or aborted; and remote alarm transmission. In this later system, recognition is given to the fact that the majority of accidents occur in the bathroom. Accordingly, the system is arranged so that when an individual enters the bathroom the direction sensitive photocell arrangement detects this entry and causes the timing cycle of the electronic timer to be reduced to its short time period, for example, about one hour. If the individual does not exit within the one hour period, for example, due to incapacity or inactivity of the individual, a pre-alarm cycle will be initiated and, if the pre-alarm cycle is not terminated or aborted by the individual, an actual alarm cycle will be initiated after passage of a short period of time (e.g., about ¼ hour). In the event the individual exits from the bathroom within the one hour period, the direction sensitive photocell arrangement will detect this exit and cause the timing cycle of the electronic timer to be set or returned to its longer time cycle, for example, about 8 hours. During any pre-alarm cycle caused by non-use of any of the actuating units within the individual's residence the individual may, unless incapacitated, abort or cancel the pre-alarm cycle by actuation or use of any actuating unit (which resets the timer) so that no actual alarm condition will be produced. The alarm condition may be generated locally or, if desired, transmitted over a telephone network, for example, in the form of a recorded message, to a central alarm center after which communication with the individual may be attempted and/or help sent or summoned.

Another system which has been proposed heretofore for passively monitoring the activities of individuals within their own residences and for producing appropriate alarm conditions is described in U.S. Pat. No. 3,989,900. In this system, the use of a standard telephone is monitored. Each time the handset of the telephone is lifted off or removed from the cradle of the telephone, for example, during the making and receiving of routine telephone calls, a timer set to cycle through a predetermined time period, for example, up to 24 hours, is caused to be reset and to repeat its timing cycle. So long as the telephone is used during the time period of the timer no alarm condition will be produced. If no use of the telephone is made during the time period of the timer, for example, due to incapacity or inactivity of the individual, a local alarm condition is produced and, simultaneously therewith, a magnetic tape player is actuated to dial continuously a plurality of telephone numbers of locations at which help may be available and to transmit a prerecorded message that help is needed at the address of the individual. If the timing out of the timer was due to inactivity rather than incapacity, the user may, in response to the local alarm condition, abort the alarm condition and data transmission sequence (within a time period of about 90 seconds) by simply lifting and replacing the handset back on the cradle of the telephone thereby resetting the timer. This latter operation may also be used to reset the timer at such time as the individual plans to leave his residence for a period of time less than the predetermined time period of the timer. An activating switch is also provided in the system for activation of the alarm condition in the case of emergencies. The abovementioned patent also contemplates the use of a high speed digital dialer and transmitter in place of the aforementioned magnetic tape player. In this case, the timing out of the timer will produce a local alarm condition and, unless the alarm sequence is aborted (for example, within a 5 minute period), the digital dialer and transmitter will operate to seize a telephone line to establish communication with the central station. The dialing of the central station continues until a receiving signal has been received from the central station whereupon an identification signal can be sent to the central station.

In still other systems which have been proposed heretofore for enabling individuals to be maintained within their own residences while providing appropriate alarm signalling in emergency or accident situations, a transmitter is employed by an individual to communicate under a variety of conditions with control apparatus located on the premises. The transmitter, which may be in the form of a small, portable hand held unit or a unit carried in a pocket or purse or attached to clothing or worn as a pendant (e.g., see U.S. Pat. Nos. 4,121,160 and 4,134,108), may be used by the individual to communicate with the control apparatus in a variety of situations, including emergency or accident situations, to respond to periodic check signals or stimuli from the control apparatus as an indication that "all is well" (e.g., see U.S. Pat. No. 3,662,111), or to respond within predetermined time periods of timer apparatus. The signals from the transmitter are typically coded rf signals employed to control circuitry within the control apparatus. Activation of a transmitter in an emergency or accident situation, or failure to activate a transmitter at required times, for example, due to incapacity or inactivity, will ordinarily cause an alarm cycle to be initiated which, if not aborted or cancelled by the individual, will cause an alarm sequence to be initiated for informing others of the emergency, accident or inactivity situation. The alarm sequence may be variously initiated by digital or tape dialers and include one or more messages, identification data, etc., to be communicated, for example, over a telephone network, to such organizations or individuals as an emergency center, the police or fire department, ambulance service, doctors, paramedics, rescue teams, relatives, friends or neighbors. In many systems, repeated attempts will be made to communicate alarm information to a central location using one or more telephone numbers, and some systems may include handshaking operations between a local control unit and central equipment and include test calls for determining proper functioning of the systems.

While the various systems as described above are useful to a degree in alleviating the problems of individuals living alone, they all have serious shortcomings and disadvantages which limit their effectiveness and usefulness. As a group, for example, these systems utilize simple data handling, processing and communication techniques, being limited more or less to tape and digital dialing, the transmission and reception of limited amounts of data, and, in some cases, simple handshaking and parity-checking operations. It is not known, for example, that any of these systems employ computers, microprocessors or the like capable of performing significant and substantial data processing, either within the residences of individuals or at central locations. As a result, these systems are susceptible to a high false alarm rate and reliability problems, these latter problems being especially exascerbated in those systems employing mechanical tape dialers and electromechanical timers and the like. In these systems, therefore, due to the lack of sophisticated data processing and communications, there is inadequate guarantee, if any, that a successful and satisfactory transmission of data, such as alarm conditions or information, has been achieved so that those persons charged with acting on this information can adequately discharge their duties. The systems as described above, perhaps also as a result of their limited data processing and communications capabilities, have limited capability in detecting or pinpointing, and distinguishing between, the malfunction of various critical components thereof, for example, actuating units, control apparatus or telephone lines. In these systems, the malfunction of a critical component thereof will, assuming that such malfunction is somehow communicated to a responsible person (e.g., as a result of an alarm condition), ordinarily require service personnel to enter a person's home and check out the entire system or a major part thereof to pinpoint the particular source of trouble or malfunction. Further, in those systems employing timers having one or more resettable time periods (e.g., a one-hour bathroom cycle and/or a regular 8-hour cycle), these time periods are alterable only within the residences of individuals, thereby requiring costly service calls by service personnel to effect the alterations. The alteration of timer periods only within the residences of individuals can also have the effect of increasing the chances of tampering by these individuals.

In addition to the abovementioned general shortcomings and disadvantages, the systems as described hereinabove have other and more specific shortcomings and disadvantages which limit their effectiveness and usefulness in a home health care environment. For example, in the Swedish systems the multiple actuating units and the alarm switches are hard-wired to the control units. This hard-wiring operation makes the installations of these systems complex, time-consuming and expensive. In addition, while using several diverse "passive" actuating units, the Swedish systems do not make use of a common passive actuating unit generally available and used frequently in most residences, namely, the telephone. While the systems described in U.S. Pat. No. 3,989,900 employ a telephone as a passive actuating unit, no other passive actuating units are employed, thereby reducing the scope of monitoring of the activities of individuals. In addition, only on/hook to off-/hook transitions of the telephone are used to reset the timer in the control unit. Thus, at the conclusion of a telephone conversation the off/hook to on/hook transition resulting from the individual replacing the handset on the cradle of the telephone will not reset the timer, thereby having the probable effect of increasing the alarm rate of the system. In the case of the systems employing rf transmitters for transmitting alarm conditions or responding to predetermined check signals, these systems similarly do not employ passive actuating units and thereby have a reduced scope of monitoring of the activities of individuals and, therefore, a reduced effectiveness.

BRIEF SUMMARY OF THE INVENTION

In accordance with the present invention a data processing apparatus is provided for receiving and processing coded words in a system such as a home health care system as described hereinabove. Each coded word received and processed by the data processing apparatus includes, in succession, a reference bit, a start bit, and additional bits. The various bits are encoded within a corresponding number of bit periods by a predetermined number of cycles of a signal of a predetermined frequency. The start bit is reversed in phase with respect to the phase of the reference bit to represent a first logic value, and each of the additional bits is either reversed in phase or not reversed in phase with respect to the preceding bit thereby to represent a first logic value or second logic value, respectively.

The data processing apparatus in accordance with the invention includes a first sampling apparatus arranged to take successive samples of each word as received at an input terminal. A comparator apparatus operates to compare samples taken by the first sampling apparatus with frequency data representing a signal of the predetermined frequency and at least one approximation thereof. A first apparatus operates when samples produced by the first sampling apparatus compare with the frequency data of the comparator apparatus to produce a condition indicating the reception of a reference bit. A second apparatus operates following the aforesaid condition produced by the first apparatus, and when succeeding samples produced by the first sampling apparatus do not compare with the frequency data of the comparator apparatus, to invert said samples. The comparator apparatus further operates to compare the inverted samples with the frequency data. A fourth means operates when inverted samples compare with the frequency data of the comparator apparatus to produce a condition indicating a phase reversal corresponding to a start bit of the sampled word.

A start apparatus operates following the aforesaid condition produced by the third apparatus to establish a count representing a predetermined time period the expiration of which corresponds to a predetermined point in the next bit period following the start bit period. A second sampling apparatus is arranged to alter the count established by the start apparatus and, at the expiration of the predetermined time period, to take successive samples of the word at the input. A fourth apparatus operates for each successive bit period following the start bit period to establish a count representing the aforesaid predetermined time period the expiration of which corresponds to the predetermined point in the next bit period. The abovementioned second sampling apparatus further operates to alter the count established by the fourth apparatus and, at the expiration of the predetermined time period, to take successive samples of the word at the input.

A fifth apparatus is arranged for each bit period following the start bit period, and following the establishing of each count representing the predetermined time period by the fourth apparatus, to determine the phase of the bit in the previous bit period relative to the reference phase. If the phase of the bit is different from the reference phase, the fifth apparatus operates to invert the samples taken by the second sampling apparatus. If the phase of the bit is the same as the reference phase, the samples taken by the second sampling apparatus are not inverted by the fifth apparatus. The comparator apparatus is further operative following each determination by the fifth apparatus to compare the inverted or non-inverted samples of the fifth apparatus with the frequency data. A sixth apparatus operates if inverted or non-inverted samples of the fifth apparatus in each bit period following the start bit period compare with the frequency data of the comparator apparatus to produce an output of the second logic value. A seventh apparatus operates if inverted or non-inverted samples of the fifth apparatus in each bit period following the start bit period do not compare with the frequency data of the comparator apparatus, to invert the samples. The comparator apparatus is further operative to compare the inverted samples of the seventh apparatus with the frequency data. An eigth apparatus operates if the inverted samples of the seventh apparatus compare with the frequency data of the comparator apparatus to produce an output of the first logic value.

BRIEF DESCRIPTION OF THE DRAWING

Various objects, features and advantages of a monitoring and signalling system in accordance with the present invention will be had from a detailed discussion taken in conjunction with the accompanying drawing in which.

DETAILED DESCRIPTION OF THE INVENTION

Figure 1:
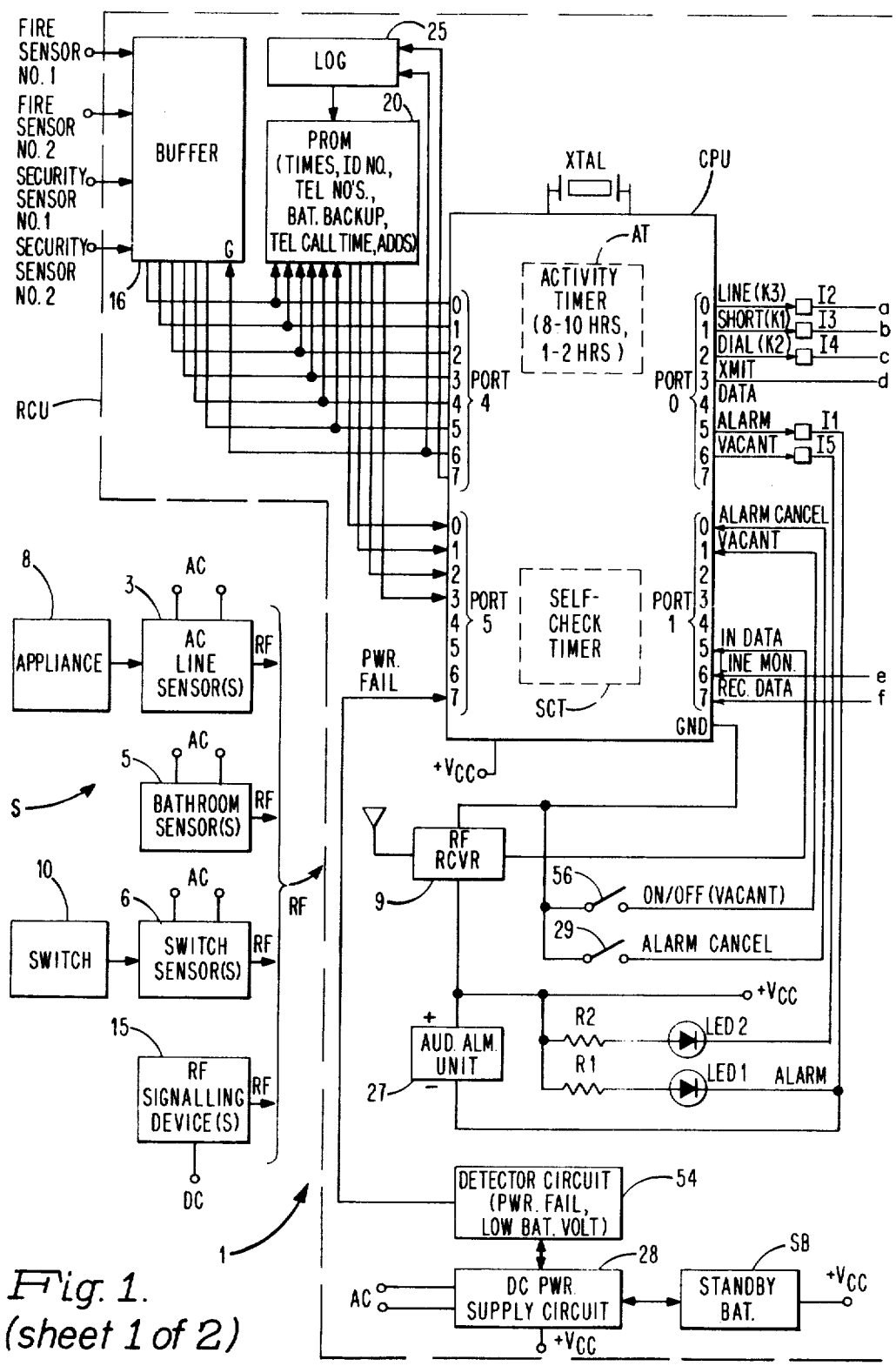
FIG. 1 is a schematic block diagram of a monitoring and signalling system in accordance with the present invention.
Figure 1:
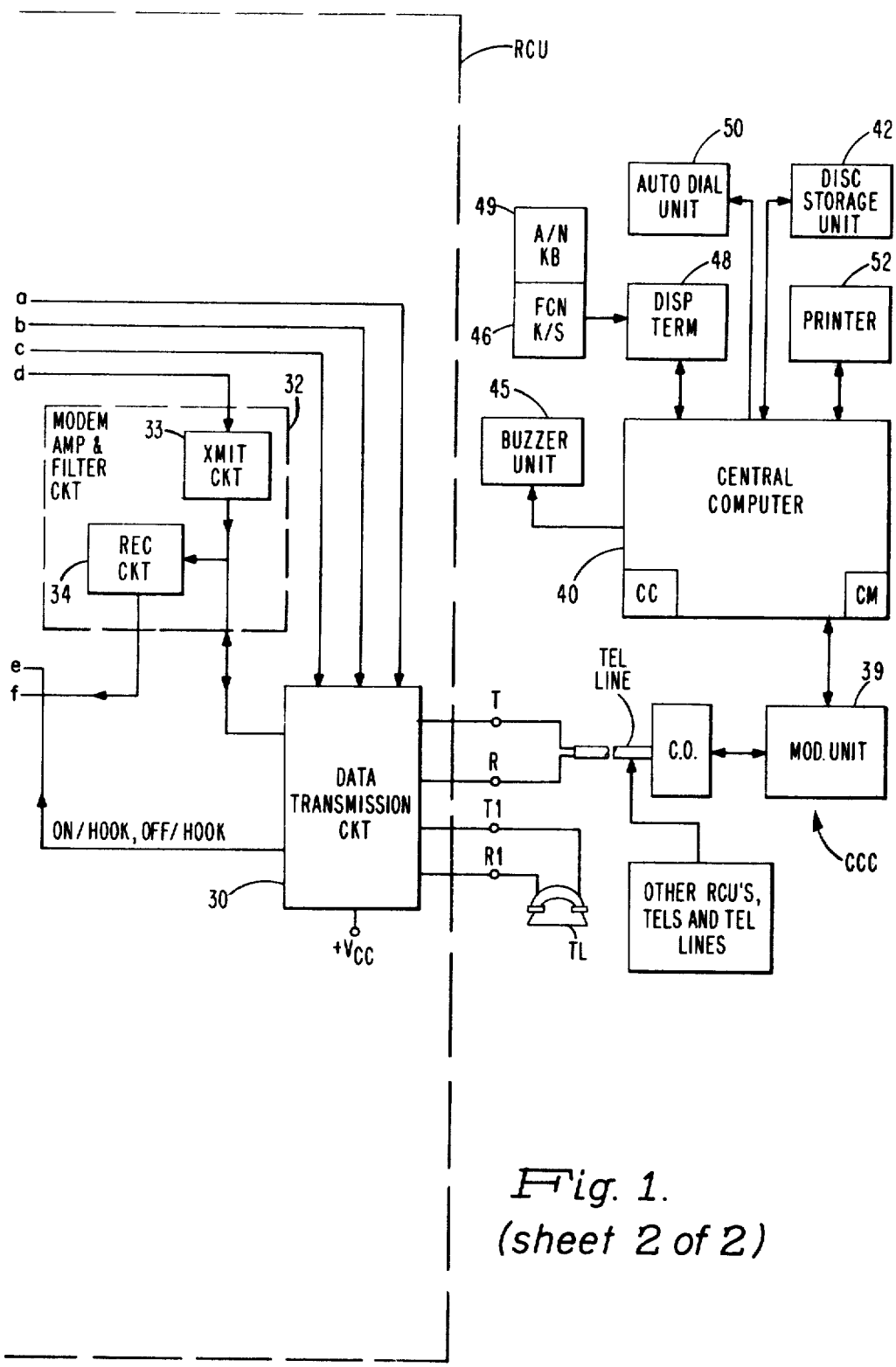

The present invention is described in detail in co-pending patent application Ser. No. 094,017, filed Nov. 14, 1979 in the names of Hans G. Blank and Martin L. Resnick, such application being allowed and the issue fee has been paid. The following portions of that co-pending application are incorporated herein by reference:

(a) FIGS. 2-66 and the corresponding brief description thereof under the heading "BRIEF DESCRIPTION OF THE DRAWING"; and (b) The entire portion of the specification following the heading "DETAILED DESCRIPTION OF THE INVENTION".

What is claimed is:

1. A data processing apparatus for receiving and processing coded words, each word including, in succession, a reference bit, a start bit, and additional bits, said bits being encoded within a corresponding number of bit periods by a predetermined number of cycles of a signal of a predetermined frequency, said start bit being reversed in phase with respect to the phase of the reference bit to represent a first logic value and each of the additional bits being either reversed in phase or not reversed in phase with respect to the preceding bit thereby to represent a first logic value or second logic value, respectively, said apparatus comprising:

an input arranged to receive each word;

first sampling means arranged to take successive samples of each word received at the input;

comparator means operative to compare samples taken by the first sampling means with frequency data representing a signal of the predetermined frequency and at least one approximation thereof;

first means operative when samples produced by the first sampling means compare with the frequency data of the comparator means to produce a condition indicating the reception of a reference bit;

second means operative following the aforesaid condition produced by the first means and when succeeding samples produced by the first sampling means do not compare with the frequency data of the comparator means to invert said samples;

said comparator means being further operative to compare the inverted samples with the frequency data;

third means operative when inverted samples compare with the frequency data of the comparator means to produce a condition indicating a phase reversal corresponding to a start bit of the sampled word;

start means operative following the aforesaid condition produced by the third means to establish a count representing a predetermined time period the expiration of which corresponds to a predetermined point in the next bit period following the start bit period;

second sampling means arranged to alter the count established by the start means and operative at the expiration of the predetermined time period to take successive samples of the word at the input;

fourth means operative for each successive bit period following the start bit period to establish a count representing the aforesaid predetermined time period the expiration of which corresponds to the predetermined point in the next bit period;

said second sampling means being further operative to alter the count established by the fourth means and operative at the expiration of the predetermined time period to take successive samples of the word at the input;

fifth means arranged for each bit period following the start bit period and following the establishing of each count representing the predetermined time period by the fourth means to determine the phase of the bit in the previous bit period relative to the reference phase, and operative if the phase is different from the reference phase to invert the samples taken by the second sampling means and if the phase is the same as the reference phase to not invert the samples taken by the second sampling means;

said comparator means being further operative following each determination by the fifth means to compare the inverted or non-inverted samples of the fifth means with the frequency data;

sixth means operative if inverted or non-inverted samples of the fifth means in each bit period following the start bit period compare with the frequency data of the comparator means to produce an output of the second logic value;

seventh means operative if inverted or non-inverted samples of the fifth means in each bit period following the start bit period do not compare with the frequency data of the comparator means to invert the samples;

said comparator means being further operative to compare the inverted samples of the seventh means with the frequency data; and eighth means operative if the inverted samples of the seventh means compare with the frequency data of the comparator means to produce an output of the first logic value.

2. A data processing apparatus in accordance with claim 1 wherein:

the comparator means is operative to compare samples and inverted samples with data representing a squarewave signal of the predetermined frequency and data representing at least one approximation of the squarewave signal of the predetermined frequency.

3. A data processing apparatus in accordance with claim 2 further comprising:

threshold means for retaining a count therein;

means operative in response to samples taken by the first sampling means comparing with frequency data of the comparator means to alter the count in the threshold means in a first direction; and first count examining means arranged following the comparator means producing the condition indicating the reception of the reference bit and when succeeding samples taken by the first sampling means do not compare with the frequency data of the comparator means to examine the count retained in the threshold means, and operative if the count in the threshold means is related to a predetermined threshold value to cause the second means to invert the samples and operative if the count in the threshold means is not related to the predetermined threshold value to alter the count in the threshold means in a second direction.

4. A data processing apparatus in accordance with claim 3 wherein:

the first count examining means is operative to cause the second means to invert samples when the count in the threshold means exceeds a threshold value representing the number of cycles of the signal of the predetermined frequency occurring in one half of a bit period.

5. A data processing apparatus in accordance with claim 2 further comprising:

first threshold means for retaining a count therein;

means operative in response to samples taken by the first sampling means comparing with frequency data of the comparator means to alter the count in the first threshold means in a first direction;

first count examining means arranged following the comparator means producing the condition indicating the reception of the reference bit and when succeeding samples taken by the first sampling means do not compare with the frequency data of the comparator means to examine the count retained in the first threshold means, and operative if the count in the first threshold means is related to a predetermined threshold value to cause the second means to invert the samples and operative if the count in the first threshold means is not related to the predetermined threshold value to alter the count in the first threshold means in a second direction;

second threshold means for retaining a count therein;

means operative in response to inverted samples taken by the first sampling means comparing with frequency data of the comparator means to alter the count in the second threshold means in a first direction and in response to inverted samples not comparing with the frequency data to alter the count in the second threshold means in a second direction; and said third means comprising:
second count examining means arranged to examine the count retained in the second threshold means and operative if the count in the second threshold means is related to a predetermined threshold value to produce a condition indicating a phase reversal corresponding to a start bit of the sampled word.

6. A data processing apparatus in accordance with claim 7 wherein:
the first count examining means is operative to cause the second means to invert samples when the count in the first threshold means exceeds a threshold value representing the number of cycles of the signal of the predetermined frequency occurring in one half of a bit period; and
the second count examining means is operative to produce a condition indicating a phase reversal corresponding to the start bit when the count in the second threshold means exceeds a threshold value representing the number of cycles of the predetermined frequency occurring in one half of a bit period.

7. A data processing apparatus in accordance with claim 1 comprising:
threshold means for retaining a count therein;
means operative in response to inverted samples taken by the first sampling means comparing with the frequency data of the comparator means to alter the count in the threshold means in a first direction and in response to inverted samples not comparing with the frequency data to alter the count in the threshold means in a second direction; and
said fourth means comprising:
second count examining means arranged to examine the count retained in the threshold means and operative if the count in the threshold means is related to a predetermined threshold value to produce a condition indicating a phase reversal corresponding to a start bit of the sampled word.

8. A data processing apparatus in accordance with claim 7 wherein:
the second count examining means is operative to produce a condition indicating a phase reversal corresponding to a start bit when the count in the threshold means exceeds a threshold value representing the number of cycles of the signal of the predetermined frequency occurring in one half of a bit period.

9. A data processing apparatus in accordance with claim 1 wherein:
the start means is operative following the condition produced by the third means indicating a phase reversal corresponding to the start bit of the sampled word to establish a count representing a predetermined time period the expiration of which corresponds to the mid-point of the next bit period following the start bit period.

10. A data processing apparatus in accordance with claim 9 wherein the second sampling means includes:
determining means operative to decrement the count established by the start means so as to have a predetermined value at the expiration of the associated predetermined time period; and
means operative when the count established by the start means has been decremented to the particular value to take successive samples of the word at the input.

11. A data processing apparatus in accordance with claim 1 further comprising:
word storage means adapted to store a bit therein representing a start bit and operative to receive and store therein following the start bit each output of the first and second logic values produced by the eight and sixth means, respectively.

12. A data processing apparatus for receiving and processing coded words, each word including, in succession, a reference bit, a start bit, and additional bits, said bits being encoded within a corresponding number of bit periods by a predetermined number of cycles of a signal of a predetermined frequency, said start bit being reversed in phase with respect to the phase of the reference bit to represent a first logic value and each of the additional bits being either reversed in phase or not reversed in phase with respect to the preceding bit thereby to represent a first logic value or second logic value, respectively, said apparatus comprising:
an input arranged to receive each word;
first sampling means arranged to take successive samples of each word received at the input;
comparator means arranged to compare samples taken by the first sampling means with frequency data representing a signal of the predetermined frequency and at least one approximation thereof;
first means operative when samples produced by the first sampling means compare with the frequency data of the comparator means to produce a condition indicating the reception of a reference bit;
threshold means for retaining a count therein;
count altering means operative in response to samples taken by the first sampling means comparing with frequency data of the comparator means to alter the count in the threshold means in a first direction;
control means arranged following the comparator means producing the condition indicating the reception of the reference bit and when succeeding samples taken by the first sampling means do not compare with the frequency data of the comparator means to examine the count retained in the threshold means, and operative if the count in the threshold means is related to a predetermined threshold value to invert the samples and operative if the count in the threshold means is not related to the predetermined threshold value to alter the count in the threshold means in a second direction;
said comparator means being further arranged to compare the inverted samples with the frequency data and also to compare the inverted samples with skew data representing no skewing or permissible amounts of skewing of the samples;
second means operative when inverted samples compare with the frequency data and skew data of the comparator means to produce a condition indicating a phase reversal corresponding to a start bit of the sampled word;
start means operative following the aforesaid condition produced by the second means to establish a count representing a predetermined time period the expiration of which corresponds to a predetermined point in the next bit period following the start bit period;
second sampling means arranged to alter the count established by the start means and operative at the expiration of the predetermined time period to take successive samples of the word at the input;

third means operative for each successive bit period following the start bit period to establish a count representing the aforesaid predetermined time period the expiration of which corresponds to the predetermined point in the next bit period;

said second sampling means being further operative to alter the count established by the third means and operative when the count corresponds to the expiration of the predetermined time period to take successive samples of the word at the input;

fourth means arranged for each bit period following the start bit period and following the establishing of each count representing the predetermined time period by the third means to determine the phase of the bit in the previous bit period relative to the reference phase, and operative if the phase is different from the reference phase to invert the samples taken by the second sampling means and if the phase is the same as the reference phase to not invert the samples taken by the second sampling means;

said comparator means being further operative following each determination by the fourth means to compare the inverted or non-inverted samples of the fourth means with the frequency and skew data;

fifth means operative if inverted or noninverted samples of the fourth means in each bit period following the start bit period compare with the frequency and skew data of the comparator means to produce an output of the second logic value;

sixth means operative if inverted or noninverted samples of the fourth means in each bit period following the start bit period do not compare with the frequency and skew data of the comparator means to invert the samples;

said comparator means being further operative to compare the inverted samples of the sixth means with the frequency and skew data; and seventh means operative if the inverted samples of the sixth means compare with the frequency and skew data of the comparator means to produce an output of the first logic value.

13. A data processing apparatus in accordance with claim 12 wherein:

the comparator means is operative to compare samples and inverted samples with frequency data representing a squarewave signal of the predetermined frequency and data representing at least one approximation of the squarewave signal of the predetermined frequency.

14. A data processing apparatus in accordance with claim 13 wherein:

the comparator means is further operative following the reference bit period to compare non-inverted and inverted samples with first, second and third sets of skew data, each set representing no skewing, permissable amounts of skew in a first direction and permissable amounts of skew in a second direction.

15. A data processing apparatus in accordance with claim 14 further comprising:

means operative in response to non-inverted or inverted samples compared by the comparator means being skewed either in the first direction or the second direction to adjust the existing count representing the aforesaid predetermined time period in an opposite direction to compensate for the skewing of the samples.

16. A data processing apparatus in accordance with claim 15 wherein:

the control means is operative to invert samples when the count in the threshold means exceeds a threshold value representing the number of cycles of the signal of the predetermined frequency occurring in one half of a bit period.

17. A data processing apparatus in accordance with claim 16 further comprising:

second threshold means for retaining a count therein;

means operative in response to inverted samples taken by the first sampling means comparing with frequency and skew data of the comparator means to alter the count in the second threshold means in a first direction and in response to inverted samples not comparing with the frequency data to alter the count in the second threshold means in a second direction; and said second means comprising:

second control means arranged to examine the count retained in the second threshold means and operative if the count in the second threshold means is related to a predetermined threshold value to produce a condition indicating a phase reversal corresponding to a start bit of the sampled word.

18. A data processing apparatus in accordance with claim 17 wherein:

the second control means is operative to produce a condition indicating a phase reversal corresponding to a start bit when the count in the second threshold means exceeds a threshold value representing the number of cycles of the signal of the predetermined frequency occurring in one half of a bit period.

19. A data processing apparatus in accordance with claim 18 wherein:

the start means is operative following the condition produced by the second control means indicating a phase reversal corresponding to the start bit of the sampled word to establish a count representing a predetermined time period the expiration of which corresponds to the mid-point of the next bit period following the start bit period.

20. A data processing apparatus in accordance with claim 19 wherein the second sampling means includes:

decrementing means operative to decrement the count established by the start means so as to have a predetermined value at the expiration of the associated predetermined time period; and means operative when the count established by the start means has been decremented to the particular value to take successive samples of the word at the input.

21. A data processing apparatus in accordance with claim 20 further comprising:

word storage means adapted to store a bit therein representing a start bit and operative to receive and store therein following the start bit each output of the first and second logic values produced by the seventh and fifth means, respectively.

* * * * *